United States Patent [19]
Hanai et al.

[11] 3,971,070
[45] July 20, 1976

[54] HEATING MEANS FOR HEATING A MAGNETIC TAPE ABOVE ITS CURIE POINT PRIOR TO DUPLICATION BY CONTACT WITH A MASTER TAPE

[75] Inventors: Ichiro Hanai, Ichikawa; Toshiharu Kobayashi; Kazuo Takahashi, both of Tokyo, all of Japan

[73] Assignee: Sony Corporation, Tokyo, Japan

[22] Filed: Sept. 25, 1974

[21] Appl. No.: 509,308

[30] Foreign Application Priority Data
Oct. 1, 1973    Japan.............................. 48-110339

[52] U.S. Cl. ................................................. 360/16
[51] Int. Cl.² .......................................... G11B 5/86
[58] Field of Search ............... 360/16, 17; 219/216, 219/388, 403

[56] References Cited
UNITED STATES PATENTS 3,676,612   7/1972   Kobayashi et al. .................... 360/16
3,699,267   10/1972  Hoell ................................... 360/16

OTHER PUBLICATIONS
B333,876, 1/1975, Chapman, 360/16.

*Primary Examiner*—Robert S. Tupper
*Attorney, Agent, or Firm*—Hill, Gross, Simpson, Van Santen, Steadman, Chiara & Simpson

[57] ABSTRACT

In a thermal printing apparatus for magnetic tape in which a running sleeve tape is heated up by a heating means at a predetermined position on a tape running path, pressed to a running master tape by a printing roller at another predetermined position on the tape running path and signals recorded on the master tape are thermally recorded on the slave tape, the running slave tape is located at a heating position opposite to the heating means during the thermal printing operation and it is located at a non-heating position not opposite to the heating means when the thermal printing operation is not desired.

5 Claims, 10 Drawing Figures

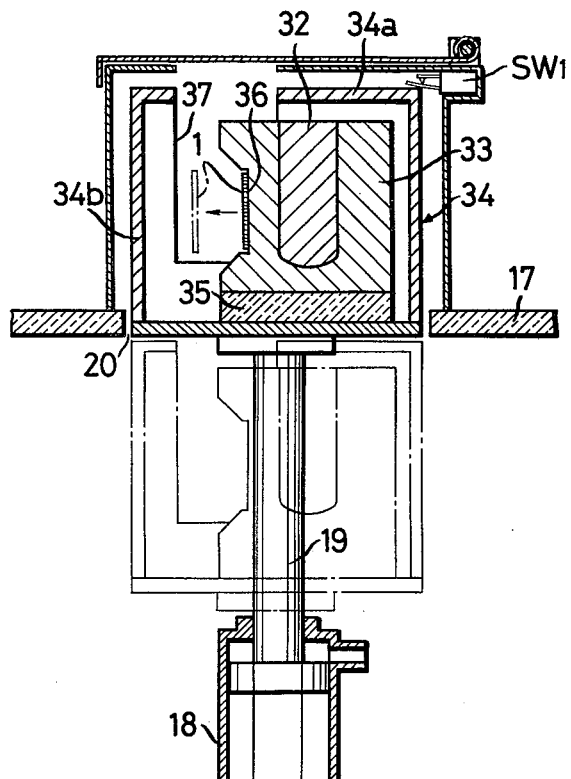
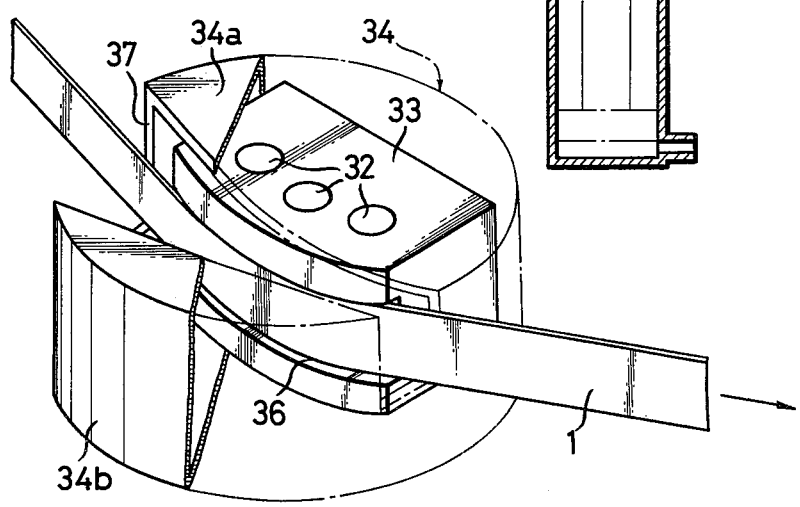

HEATING MEANS FOR HEATING A MAGNETIC TAPE ABOVE ITS CURIE POINT PRIOR TO DUPLICATION BY CONTACT WITH A MASTER TAPE

BACKGROUND OF THE INVENTION

1. Field of the Invention

This invention relates generally to a thermal printing apparatus and more particularly to a thermal printing apparatus in which a slave tape and a master tape run at the same speed, the running slave tape is heated by a heating means, for instance, a halogen lamp or a heat shoe, and then signals recorded on the master tape are thermally recorded on the slave tape when both of the tapes are pressed to each other by a printing roller.

2. Description of the Prior Art

As generally known, the slave tape should be heated up to a temperature over the Curie point (125 to 130°C), in the thermal printing apparatus.

In the conventional thermal printing apparatus, the slave tape begins to be heated with the closing of the tape start switch, by the heating means. However, the rise time of the tape running speed is very short in which the tape running speed reaches the predetermined speed after the beginning of the tape running. On the other hand, the rise time of the tape temperature is relatively long in which the slave tape is heated up to the predetermined temperature after the beginning of the tape heating. While the slave tape is not heated up to the predetermined temperature, the slave runs uselessly. That is a serious problem when the tape running is stopped for any reason during the thermal printing operation.

The heating means such as a halogen lamp cannot be exposed directly to a cooling air for rapid cooling, since the halogen lamp is easily damaged by the cooling air. Therefore, the halogen lamp has heretofore been cooled by spontaneous radiation after the cut-off of the power supply to the halogen lamp. However, the halogen lamp is not sufficiently cooled without the lapse of a long time.

When the tape is threaded on with the exchange of a slave tape, there are the dangers that the tape contacts unexpectedly with the halogen lamp to be damaged thereby and that the operator's hand gets burned in contact with the halogen lamp. Unless the halogen lamp is sufficiently cooled, such dangers cannot be avoided. Accordingly, it takes a great deal of time to exchange the tape. Operation efficiency is very low.

When the tape is stopped during the thermal printing operation, the tape is apt to be heated excessively and to be damaged. It is difficult to freely stop the tape running during the thermal printing operation.

SUMMARY OF THE INVENTION

An object of this invention is to provide a thermal printing apparatus in which a slave tape can be rapidly heated up to a predetermined temperature above the Curie point immediately after the tape starts.

Another object of this invention is to provide a thermal printing apparatus in which a slave tape can be freely stopped during the thermal printing operation.

A further object of this invention is to provide a thermal printing apparatus in which a tape can be threaded without cooling the heating means.

A still further object of this invention is to provide a thermal printing apparatus in which there is not the danger that a slave tape is melted or deformed unexpectedly in contact with a heating means.

A still further object of this invention is to provide a thermal printing apparatus which can be operated safely and simply.

A still further object of this invention is to provide a thermal printing apparatus in which a case containing a halogen lamp can be cooled without the halogen lamp being exposed directly to a cooling medium.

A still further object of this invention is to provide a thermal printing apparatus which is simple in construction.

The above and other objects, features and advantages of the invention will be apparent in the following detailed description of illustrative embodiments thereof which is to be read in connection with the accompanying drawings.

BRIEF DESCRIPTION OF THE DRAWINGS

FIG. 9 is a perspective view of a heating device in the thermal printing apparatus of FIG. 8, partly broken away; and FIG. 10 is a cross-sectional view of the heating device of FIG. 9 and means for moving up and down the heating device.

DESCRIPTION OF THE PREFERRED EMBODIMENTS

A thermal printing apparatus according to one embodiment of this invention will be described with reference to FIG. 1 and FIG. 5.

Figure 1:
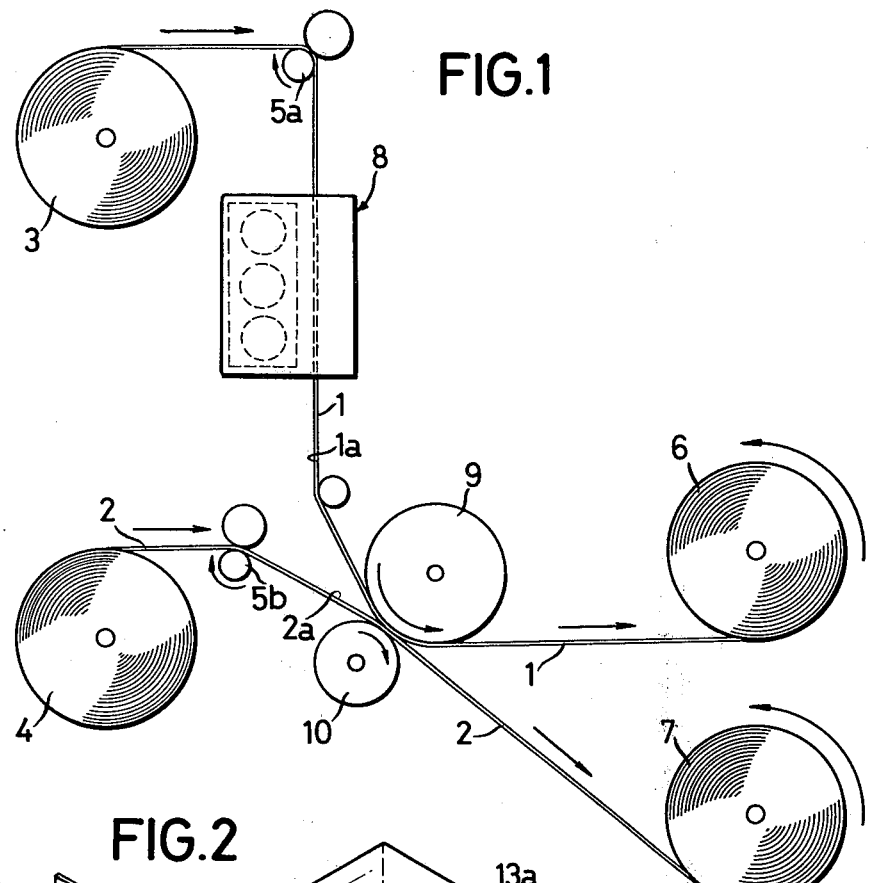
FIG. 1 is a schematic plan view of the whole of a thermal printing apparatus according to one embodiment of this invention.

Referring to FIG. 1, two magnetic tapes, i.e., a slave tape 1 and a master tape 2 are supplied from supply reels 3 and 4, respectively. The tapes 1 and 2 are coated with magnetic particles on one surface, 1a and 2a, respectively. Audio signals, video signals or other signals are recorded on the coated surface 2a of the master tape 2. The tapes 1 and 2 are drawn out from the supply reels 3 and 4 by capstans 5a and 5b in the directions shown by the arrows, guided by not shown tape guide drums and pins, respectively. Subsequently, the tapes 1 and 2 are accumulated by take-up reels 6 and 7.

Along the transport path of the slave tape 1, there is disposed a heating device 8 for heating the coated surface 1a of the slave tape 1. A cooling drum 9 and a printing roller 10 are disposed between the heating device 8 and the take-up reels 6 or 7. The tapes 1 and 2 are pressed to each other between the cooling drum 9 and the printing roller 10 so that the coated surfaces 1a and 2a contact closely with each other.

While the tapes 1 and 2 are transported at a predetermined speed with the rotations of the capstans 5a and 5b and the take-up reels 6 and 7 in the directions shown by the arrows, the coated surface 1a of the slave tape 1 is heated up above the Curie point by the heating device 8 and then the tapes 1 and 2 are pressed to each other between the cooling drum 9 and the printing roller 10. The audio signals, the video signals or the other signals recorded on the coated surface 2a of the master tape 2 are thermally printed on the coated surface 1a of the slave tape 1 with the pressing of the slave tape 1 and the master tape 2. After the pressing, the tapes 1 and 2 are separated from each other and then accumulated by the take-up reels 6 and 7, respectively. Thus, a series of thermal printing operations can be performed.

Figure 2:
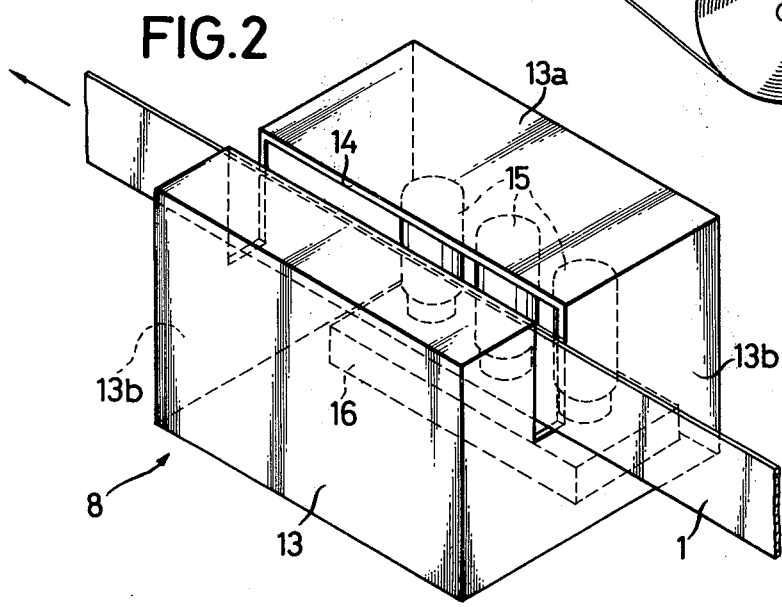
FIG. 2 is a perspective view of a heating device in the thermal printing apparatus of FIG. 1.
Figure 3:
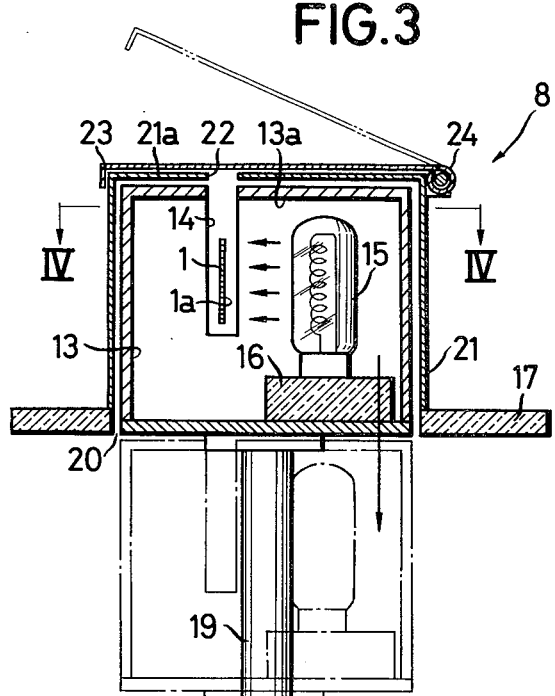
FIG. 3 is a cross-sectional view of the heating device of FIG. 1 and means for moving up and down the heating device.
Figure 4:
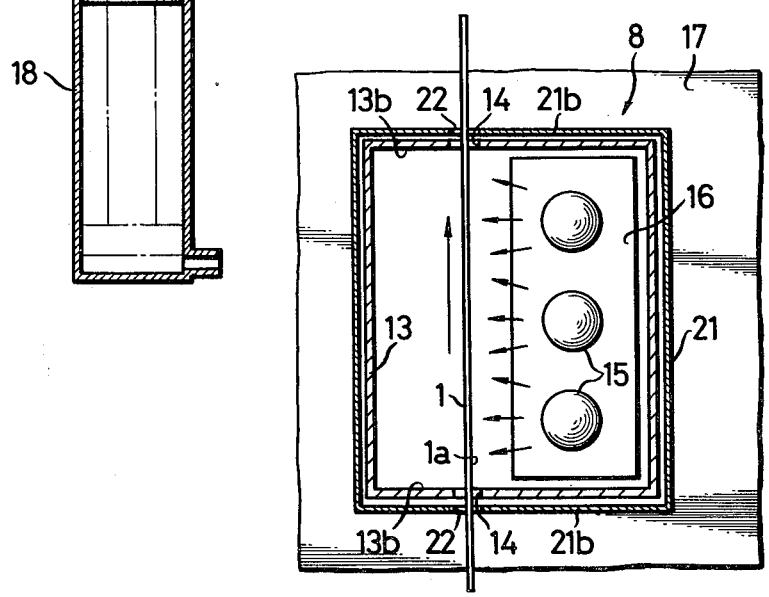
FIG. 4 is a cross-sectional view taken along the lines IV—IV of FIG. 3.

The heating device 8 is constructed as shown on FIGS. 2 to FIGS. 4. A rectangular parallelepiped shaped case 13 defines a slit 14 in its upper wall 13a and both side walls 13b. The slave tape 1 passes through the slit 14. A plurality of halogen lamps 15 are mounted on a support 16 made of adiabatic material in the case 13. The halogen lamps 15 are arranged in a line parallel with the running slave tape 1, facing to the coated surface 1a of the slave tape 1.

The case 13 can be moved up and down through an opening 20 made in an upper panel 17 of the thermal printing apparatus, by an air cylinder 18 disposed vertically under the opening 20. The upper end of a rod 19 projecting from the air cylinder 18 is connected to the bottom wall of the case 13. The case 13 containing the heating device 8 is moved up and down in parallel with the surface of the tape 1 by the rod 19 of the air cylinder 18. In FIG. 3, the upper position of the heating device 8 is shown by the solid lines and the lower position of the heating device 8 is shown by the broken lines. The positional relationships between the slave tape 1 and the lamps 15 are shown in FIG. 5, where the upper position of the lamps 15 is denoted by (A) and the lower position of the lamp 15 is denoted by (B). The slave tape 1 is heated by the lamps 15 in the position (A), while it is not heated by the lamps 15 in the position (B).

The air cylinder 18 is actuated by a change-over valve (not shown) interlocked with a tape start switch and a tape stop switch in the thermal printing apparatus. The rod 19 is moved up when the tape start switch is put into the ON-state. The rod 19 is moved down when the tape stop switch is put into the ON-state.

A heat-shielding case 21 is fixed to the upper panel 17, so as to cover the case 13 in the upper position. The heat-shielding case 21 defines a slit 22 in its upper wall 21a and both side walls 21b. The slit 22 coincides with the slit 14. Moreover, a cover 23 is pivoted to a hinge 24 at one end of the upper wall 21a of the shielding case 21, so as to cover the upper portion of the slit 22.

Next, operations of a thermal printing apparatus according to one embodiment of this invention will be described.

Before the operations, the heating device lamps 15 are located under the upper panel 17, i.e., at the position (B). When the power supply to the thermal printing apparatus is turned on, the lamps 15 begin to be heated or pre-heated. The interior of the case 13 is gradually heated up. Since the case 13 is located under the heat-shielding case 21, the interior of the heat-shielding case 21 is not heated.

In such conditions, the cover 23 is opened and the slave tape 1 is inserted into the slit 22 of the heat-shielding case 21. The slave tape 1 and the master tape 2 are threaded in the thermal printing apparatus. In the meantime, the heating device 8 is already heated up sufficiently to heat the running slave tape 1 above the Curie point.

Then, the tape start switch is put into the ON-state to begin the tape running. Simultaneously, the heating device 8 is automatically moved up to the upper position to insert the slave tape 1 into the slit 14, as shown by the solid lines in FIG. 2 to FIG. 5.

Since the heating device 8 with the lamps 15 have been heated up to the predetermined temperature, the slave tape 1 is rapidly heated up to a predetermined temperature as soon as the heating device 8 is displaced to the upper position. The rise time of the temperature of the slave tape 1 is shorter than that of the running speed of the slave tape 1. Immediately after the beginning of the running, the slave tape 1 can be heated up to the predetermined temperature. The slave tape 1 is transported out from the heating device 8 after being heated up to the predetermined temperature. The speed of the tape running matches with that of the heating of the slave tape 1 to perform a very effective thermal printing operation.

Next, the tape stop switch is put into its ON-state to stop the tape running. Simultaneously, the heating device 8 is automatically moved down from the upper position A for heating the slave tape 1 to the lower position B for not heating the slave tape 1. The slave tape 1 is released upward from the case 13. Thus, the halogen lamps 15 are kept away downward from the slave tape 1, as shown by the broken lines in FIG. 3 and FIG. 5.

As long as the power is supplied to the apparatus, the halogen lamps 15 keep heating even at the lower position B. However, the stopped slave tape 1 is not being heated by the halogen lamps when the lamps are in their lower position, since the slave tape 1 is above the heating device 8.

When the slave tape 1 is stopped for any reason during the operation of the thermal printing apparatus, a danger is removed that the slave tape 1 would be rapidly heated up in the instant of stopping, so as to melt or to deform. Immediately after the slave tape 1 starts to run, the heating device 8 is moved to its upper position A so as to heat the slave tape 1 rapidly.

In the exchange of the tape, the tape is threaded during the condition that the heating device 8 is displaced to its lower position B. Since the heating device 8 is moved down under the heat-shielding case 21, the danger is removed that slave tape 1 contacts unexpectedly with the halogen lamp 15 or the case 13 so as to melt or be deformed. Another danger is removed, that is that an operator's hand might contact unexpectedly the halogen lamp 15 or the case 13 so as to be burned. After the threading operation of the tape, the tape starts to run and the heating device 8 is moved up to the upper position A to heat rapidly the slave tape 1.

In the above-embodiment, an air cylinder 18 is used for moving the heating device 8. An oil cylinder or a combination of a screw feeder and a motor may be used.

Another embodiment of this invention will now be described with reference to FIG. 6 and FIG. 7. Parts in FIG. 6 and FIG. 7 which correspond with the parts in the first embodiment, are denoted by the same reference numerals.

In this embodiment, the case 13 comprises an inner wall 26a and an outer wall 26b which define a cooling path 27.

Figure 6:
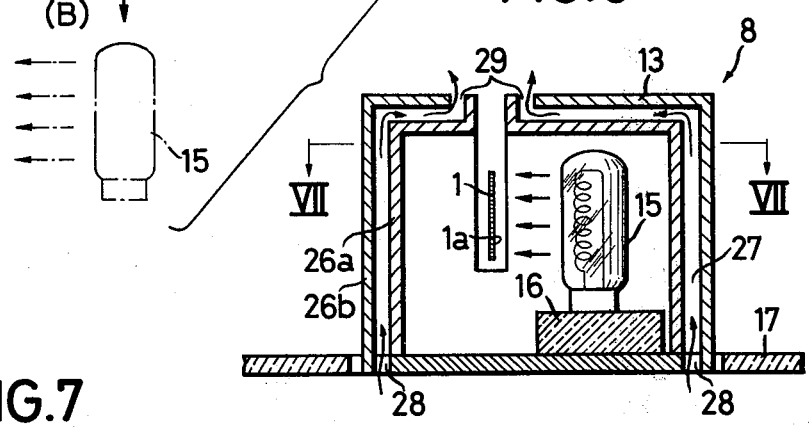
FIG. 6 is a cross-sectional view of a heating device in a thermal printing apparatus according to another embodiment of this invention.
Figure 7:
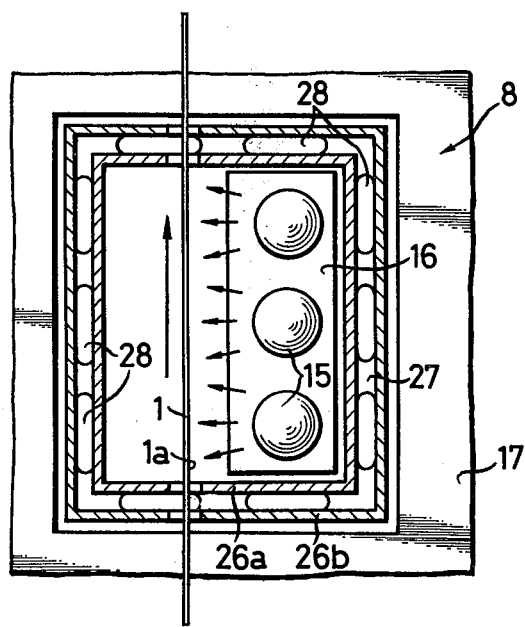
FIG. 7 is a cross-sectional view taken along the lines VII—VII of FIG. 6.

A cooling medium such as a cooling air or a cooling water flows through the cooling paths 27 extending from inlets 28 to outlets 29 in the directions shown by the arrows on FIG. 6. Thus, the case 13 is effectively cooled without the facts that the halogen lamps 15 are exposed directly to the cooling medium and that the halogen lamps 15 are prevented from heating the slave tape 1.

According to the construction of this embodiment, only the case 13 is always cooled even during the operation of the thermal printing apparatus. Therefore, the heat-shielding case 21 is not especially required. When the heat-shielding case 21 is used besides, it is not heated by the case 13. That is very advantageous for safety.

Next, a further embodiment of this invention will be described with reference to FIG. 8 to FIG. 10. Parts in FIG. 8 to FIG. 10 which correspond with the parts in the other embodiments, are denoted by the same reference numerals.

In this embodiment, a heat shoe 33 is used as the heating device 8. The heat shoe 33 is embedded with a plurality of heat generators 32. A nearly cylindrical case 34 contains the heat shoe 33 which is mounted on a support 35 made of adiabatic material. The heat shoe 33 defines an arcuate tape guide groove 36 on its one surface (see FIG. 9). An opening 37 for inserting the slave tape 1 is formed on an upper wall 34a and a side wall 34b of the case 34. The heat shoe 33 is formed of brass and plated with hard chromium. The slave tape 1 is inserted through the opening 37 into the case 34. In the thermal printing operation, the slave tape 1 runs in contact with the tape guide groove 36 of the heat shoe 33, so that the slave tape 1 is heated up to the predetermined temperature by the heat shoe 33 which is heated by the heat generators 32.

The bottom of the cylindrical case 34 is fixed to the upper end of the rod 19 projecting from the air cylinder 18, as in the first embodiment. The cylindrical case 34 containing the heat shoe 33 is moved up and down in parallel with the surface of the slave tape 1 by means of the air cylinder 18. The cylindrical case 34, namely or the heat shoe 33 is located at the upper position A for heating the slave tape 1 or at the lower position B for not heating the slave tape 1.

A tape guide pin 38 is positioned opposite to an inlet of the case 34. The tape guide pin 38 is attached to one end of a nearly arcuate control arm 40 secured to a rotatable supporting pin 39 in the upper panel 17 of the apparatus. An arm 41 is also secured to the lower end of the supporting pin 39. The arm 41 is interlocked with a solenoid actuated plunger 43 which is reciprocably mounted in solenoid 42 arranged under the upper panel 17, through a connecting rod 44. The control arm 40 is normally urged anticlockwise (FIG. 8) around the supporting pin 39 by a spring 45.

When the plunger solenoid 42 is not energized, the tape guide pin 38 is located at a position X, shown by the dash-dot line, by the spring 45. When the plunger solenoid 42 is energized, the plunger 43 causes the supporting pin 39 to rotate clockwise by the connecting rod 44 and the arm 41. Thus, the control arm 40 is rotated clockwise (FIG. 8) against the spring 45 and the tape guide pin 38 is moved from the position X to another position Y shown by the solid line in FIG. 8.

Figure 8:
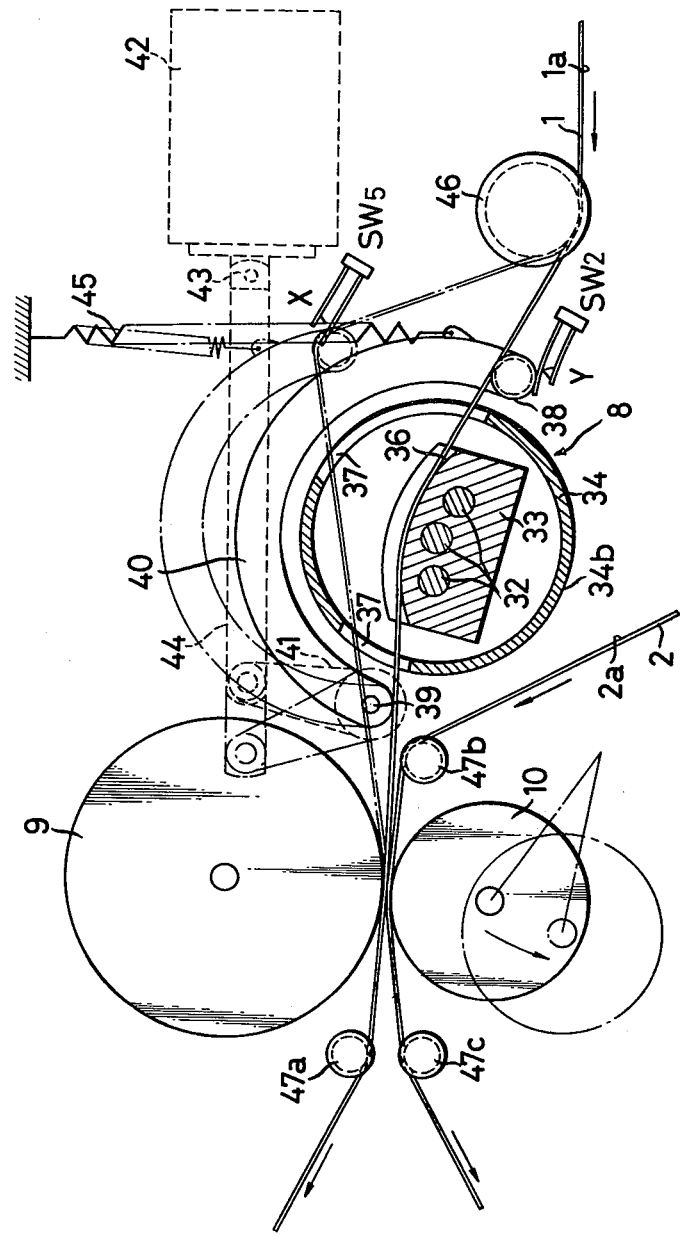
FIG. 8 is a fragmentary schematic plan view of a thermal printing apparatus according to a further embodiment of this invention.

When the tape guide pin 38 is located at the position X, the slave tape 1 is separated from the heat shoe 33 by the tape guide pin 38, as shown by the ghost lines in FIG. 8. And when the tape guide pin 38 is located at the position Y, the slave tape 1 contacts with the tape guide groove 36 of the heat shoe 33, as shown by the solid lines on FIG. 8.

A switch $SW_1$ (FIG. 10) is provided for detecting the heating device 8 at the position A (FIG. 5) to energize the plunger solenoid 42. A switch $SW_2$ is provided for detecting the tape guide pin 38 at the position Y to supply power to a tape driving motor. And a switch $SW_5$ is provided for detecting the tape guide pin 38 at the position X to drive the rod 19 downward.

The cooling drum 9 functions also as a capstan. The printing roller 10 is pressed to, or separated from the cooling drum 9, and so it functions also as a pinch roller. A tape guide roller 46, stationary tape guide pins 47a, 47b and 47c are arranged as shown in FIG. 8.

In this embodiment, the heating device 8 can be sufficiently distant from the slave tape 1 when the heating device 8 is moved up and down. There is scarcely a danger that the slave tape 1 is unexpectedly caught on the heat shoe 33 to be damaged thereby. The slave tape 1 can be smoothly and safely moved up and down.

In the above embodiments, the heating device 8 is moved up and down relative to the slave tape 1 located at the fixed position. According to this invention, the slave tape 1 may be moved up and down relative to the heating device 8 located at the fixed position.

Moreover, in the above embodiments, the position B of the heating device 8 for not heating the slave tape 1 is under the slave tape 1. According to this invention, the position B of the heating device 8 for not heating the slave tape 1 may be above the slave tape 1, where the heating device 8 is moved above the slave tape 1.

In short, the slave tape is heated up to the predetermined temperature by any heating means in the thermal printing operation. When the thermal printing operation is not desired, the heating means is moved to the position for not heating the slave tape.

A method is considered in which a heat-shielding plate is interposed between the heating means and the slave tape when the thermal printing operation is not desired. However, the heat-shielding plate should have an extremely high heat-shielding effect since it should intercept heat at an extremely high temperature. It is difficult to obtain material having such an extremely high heat-shielding effect at present. Even though heat is intercepted by the heat-shielding plate, the heat-shielding plate is heated with time and then the slave tape is heated by the heat radiated from the heat-shielding plate. It becomes less effective. Accordingly, it is impossible for the heat-shielding plate to keep intercepting the heat for a long time.

Figure 5:
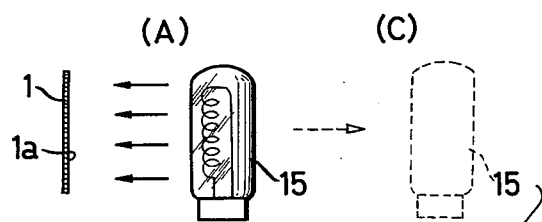
FIG. 5 is a schematic view illustrating the relationship between the heating device or a halogen lamp and a slave tape.

Another method is considered in which the heating means is horizontally moved to a position C (FIG. 5) for not heating the slave tape, opposite to the slave tape (FIG. 5). However, the distance between the slave tape and the position C of the heating means should be very large in the method. Or the heat-shielding plate should be used together. The apparatus according to the method should be large-sized since the heating means should be moved in the large distance between the position A for heating the slave tape and the position C for not heating the slave tape. Moreover, it is complicated in construction.

The thermal printing apparatus according to this invention has the following advantages:

1. The heating means can be preheated in its position where it does not heat the slave tape before the tape running. The tapes begin to run after the heating means is heated up to the predetermined temperature. Thus, as soon as the tapes begin to run, the slave tape can be rapidly heated up to a temperature above the Curie point. It prevents the slave tape from continuing to run without being heated up to the predetermined temperature, for a certain time after the beginning of the tape running. Accordingly, the tape can be effectively utilized.

2. Although the heating means remains heated during the stopping of the tapes, there is not the danger that the slave tape is unexpectedly melted or deformed. The tapes can be stopped any time during the thermal printing operation.

3. In the exchange of the tape, the tape can be threaded without cooling the heating means in the apparatus. Accordingly, the tape threading operation can be rapidly performed. Moreover, there is no danger that the tape will be unexpectedly melted or deformed in contact with the heating means nor that the operator's hand will get burned by the heating means, during the tape threading operation.

4. The heating means can be moved to the position for not heating the slave tape, in a small distance. No heat-shielding plate is required between the heating means and the slave tape. The apparatus is simple in construction and of small size.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined in the appended claims.

We claim as our invention:

1. A thermal printing apparatus for duplicating magnetic data on a slave tape from a master tape, comprising:
   a. means for transporting said master tape on which said data is recorded;
   b. means for transporting said slave tape;
   c. means for bringing said master and slave tapes into contact with each other so as to print said data on said master tape onto said slave tape;
   d. means for heating said slave tape to a predetermined temperature above its Curie point prior to bringing said slave tape into contact with said master tape and said master and slave tapes held in contact until said slave tape cools below its Curie point;
   e. a housing substantially enclosing said heating means and formed with a slot into which said slave tape is received such that when in said slot it is heated by said heating means, and
   f. means for moving said heating means relative to said housing to a first position so that said slave tape and said heating means are separated so that said slave tape is not heated by said heating means and to a second position where said slave tape is heated by said heating means within said housing.

2. A thermal printing apparatus according to claim 1 including means for energizing said heating means begins prior to energization of said transport means, said moving means moving said heating means to the position for heating said slave tape from the position of not heating said slave tape upon energization of said transport means, and said heating means moved to the position for not heating said slave tape upon deenergization of said transport means.

3. A thermal printing apparatus according to claim 1 wherein said housing for said heating means comprises an inner wall and an outer wall, and a cooling medium flowing through paths formed between said inner and outer walls to cool them.

4. A thermal printing apparatus according to claim 1 including at least one tape guide member arranged near said heating means along the slave tape running path, said tape guide member movable to engage said slave tape, and the direction of the tape running path being varied by said tape guide member to bring said slave tape into close proximity with said heating means for thermal printing, and to separate said slave tape from said heating means when the thermal printing operation is not desired.

5. A thermal printing apparatus according to claim 1 wherein said means for moving said housing comprises a fluid driven cylinder.

* * * * *